No Printed Specification Available
9725X
E. Barrett
Scythe
Patented Jun. 16, 1836.
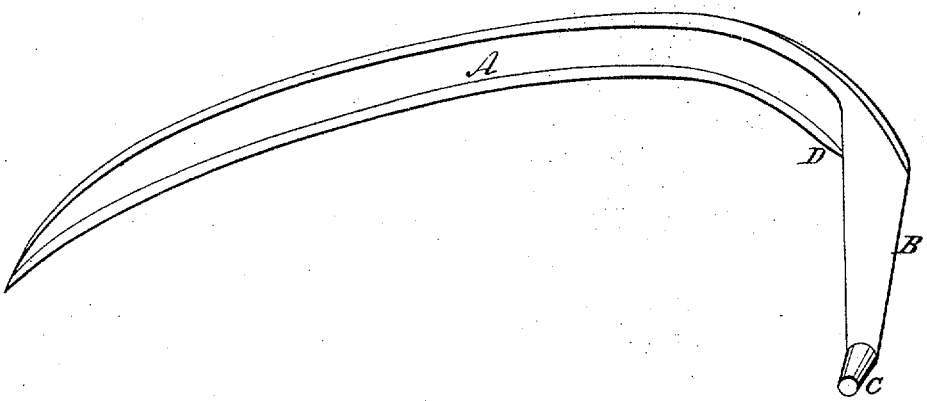
THE NORRIS PETERS CO., WASHINGTON, D. C.

Ezra Barnett of Warner county of Merrimack, State of New-Hampshire

Letters Patent.

The schedule referred to in these Letters Patent, and making part of the same, containing a description in the words of the said Ezra Barnett himself of his improvement in the Scythe:

To all, to whom these Presents shall come

Be it known, that I Ezra Barnett of Warner, in the county of Merrimack, and state of New Hampshire, have invented a new and useful improvement on scythes, as it respects a crook in the blade from 8 to 10 inch at the heel and extending the edge of the scythe at the heel to the ring, and in the shape and length of the shank, and shape of the claw, the following is a full and exact description thereof. Viz.

A crook in the blade of the scythe from 8 to 10 inch at the heel, similar to the gathering part of a sickle, so as to cut the grass clean and easy as it gathers at the heel; with this crook at the heel of the scythe, the principle part of the grass is cut from the middle to the heel, exactly reverse to that of the common strait heel scythe The edge of the scythe is also extended at the heel to the ring so as to prevent the grass escaping uncut therefrom The shank from the heel of the scythe to the claw is from 4 1/2 to 5 inch. long, flat on the upperside and an oval round upon the underside similar to what is called a flat half round file, with a regular taper from the heel to the claw, as it respects both the width and thickness, so as to admit the ring to pass over the shank to the heel without the necessity of cutting away the snaith to injure it, the shank being thus formed will exactly fill the space made upon the snaith to receive it, and thereby completely fill the ring so as not to admit or require a wedge to make it perfectly tight and firm upon the snaith, thus the ring and heel of the snaith are both preserved from injury by the driving and pressure of a wedge.

The shank being of the length above described, requires but a small claw, which is about one quarter of an inch in diameter, half an inch in length and round, and a little tapering from the shank to the end, which gives another advantage to the snaith, as it is less injured by cutting off the wood in making a hole to receive the claw, and is much less exposed to damage by putting on and taking off the scythe, besides the round claw does not weaken the snaith so much as one that is square —

It is a well known fact, that that part of the snaith, where the claw enters is almost uniformly the first that fails, this is owing in part to the shortness of the shank of the scythe, and thickness of it at the claw, and partly to the improper size and shape of the claw — By comparing my model with the scythes now in use, the utility of the above described improvement will I think clearly appear —

This improvement may be applied with equal advantage to Farwell's Patent cimeane scythes, or to any others now manufactured There has been some attempts to introduce a crooked blade scythe but the crook was not at the heel, but from 6 to 12 inches from it, and the operation of it was entirely different, as was also the shape and effect produced by it —

What I claim above as my own invention and improvement on scythes, not known or used before my application, is a crook in the blade from 8 to 10 inches at the heel and extending the edge of the scythe at the heel to the ring, and in the shape & length of the shank, and shape of the claw as above described — in the above specification —

Witnesses
Daniel Sawyer
Elisha E. Hoyt

Ezra Barnett

Drawing 742-1881